United States Patent Office 3,849,336
Patented Nov. 19, 1974

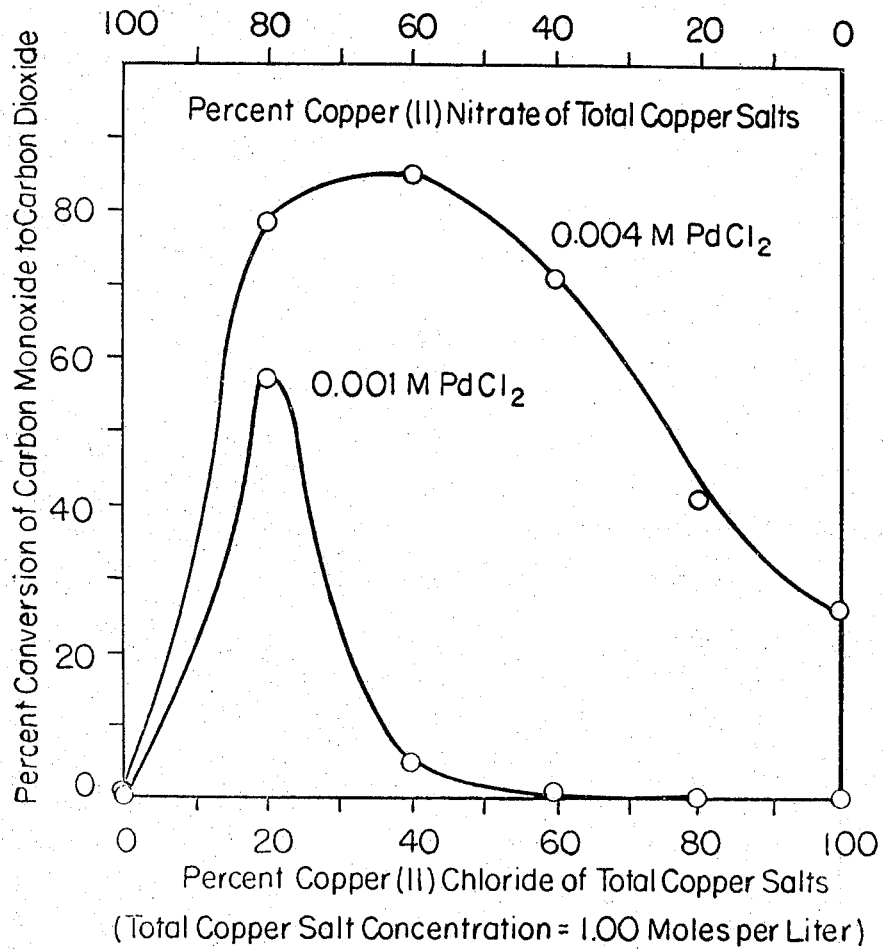

3,849,336
PALLADIUM COMPOSITIONS SUITABLE AS
OXIDATION CATALYSTS
William G. Lloyd and Donald R. Rowe, Bowling Green, Ky., assignors to Larox Research Corporation, Bowling Green, Ky.
Original application Feb. 7, 1972, Ser. No. 223,970, now Patent No. 3,790,662. Divided and this application Sept. 20, 1973, Ser. No. 399,359
Int. Cl. B01j 11/82, 11/78
U.S. Cl. 252—438                     10 Claims

ABSTRACT OF THE DISCLOSURE

Homogeneous and heterogeneous catalysts systems containing certain palladium (II) salts and copper (II) salts have been developed. A specified balance of a copper (II) halide and of a non-halide copper (II) salt is maintained. The catalysts are effective for oxidizing CO to $CO_2$ and $SO_2$ and $SO_3$.

This is a division, of application Ser. No. 223,970, filed Feb. 7, 1972, now Pat. No. 3,799,662.

FIELD OF INVENTION

This invention has to do with compositions containing a palladium (II) salt, a copper (II) halide and a non-halide copper (II) salt. The compositions are effective oxidation catalysts, particularly for the oxidation of CO to $CO_2$, and $SO_2$ to $SO_3$.

BACKGROUND OF INVENTION

In recent years, considerable attention has been given to methods for removing CO and $SO_2$ from our environment. CO is a pollutant, particularly as an exhaust product from motor vehicles. Nationally the transportation industry is responsible for 42% of the total air contaminants emitted to the atmosphere; and carbon monoxide, a colorless, odorless and lethal gas, being one of the major components of automobile exhausts is the largest single air pollutant. Of the 90.5 million tons of carbon monoxide emitted in 1968 to the atmosphere, 63.8 million tons or 71% came from transportation activities. $SO_2$ is also a pollutant, but generally as a product from the burning of relatively high sulfur heating oils and coals.

The oxides of sulfur on a national basis in 1968 accounted for an estimated 33 million tons, or 15-16% of the total emitted air contamination. Of this, fuel combustion by stationary sources accounted for 24.4 million tons or 74% of the total oxides of sulfur. The most important air pollutants among the oxides of sulfur are sulfur dioxide, $SO_2$, and sulfur trioxide, $SO_3$. The estimate ratio of $SO_2$ to $SO_3$ in the atmosphere of Chicago is 100:1. The conversion of $SO_2$ to $SO_3$ in air is very slow. The major source of $SO_2$ is from the combustion of sulfur-containing fuels.

Many catalysts and cambinations of catalysts have been proposed to convert CO to $CO_2$ and/or $SO_2$ to $SO_3$ or sulfuric acid. These have suffered from a variety of disadvantages, including high cost, high susceptibility to poisoning and short catalyst lifetimes, low conversion rates at low temperatures or at low flow rates or at low concentrations of the contaminant gas, high head loss, and undesirable side reaction products. For example, a copper chromite catalyst in the presence of water vapor converts nitrogen oxides to ammonia; an iron oxide-iron sulfate catalyst emits hydrogen sulfide; uranium on alumina is not effective at low CO concentrations; manganese oxide is unsuited to high-temperature operation; hopcalite catalysts are poisoned by water vapor.

Most of the known art of palladium-catalyzed oxidations is directed to the oxidation of olefins to carbonyl compounds, mainly acetaldehyde and ketones. This reaction, as well as the palladium (II) chloride oxidation of CO, was first reported by F. C. Phillips (Z. anorg. Chem., 6, 229 (1894)).

Dragerwerk (German 713,791) shows the successful incorporation of palladium (II) chloride and copper (II) chloride to obtain the catalytic oxidation of CO using atmospheric oxygen as the ultimate oxidant. Thus Example 1 uses a "dilute hydrochloric acid" solution of $PdCl_2$ and $CuCl_2$, and, like Phillips, recommends elevated temperatures (80–100° C.). Both Phillips and Dragerwerk worked with halide salts, and both found it desirable to operate at somewhat elevated temperatures in order to overcome the sluggishness of the reaction at ambient temperatures. This has also been observed in more recent studies by Markov (V. D. Markov and A. B. Fasman, Zh. Fiz. Khim., 40, 1564 (1966); V. D. Markov, V. A. Golodov, and A. B. Fasman, Izv. Sib. Otd. Akad. Nauk SSSR, Ser. Khim. Nauk, 1968, 36), who worked with excess chloride or bromide ions present and who found the reaction between Pd (II) and Co to be slow as to be the rate-determining step of the overall reaction.

Lloyd (U.S. 3,410,807) has described the chemistry of homogeneous solutions of palladium (II) and copper (II) salts in alcoholic solvent-media. In substantially dry alcoholic systems (less than 2% water), CO is reacted with the alcohol solvent-reactant to synthesize organic carbonate esters; similarly, $SO_2$ is reacted to synthesize organic sulfate esters. For the purposes of air pollution control and abatement, these reaction systems would release exit gas streams saturated with the volatile alcoholic solvent-reactant, and would be unacceptable from both an economic and environmental standpoint, and in the case of CO oxidation would require side-stream removal of the carbonate ester formed in the reaction.

The first reported supported catalytic oxidation of CO with Pd (II) and Cu (II) appears in the Dragerwerk patent. More recent work with supported palladium catalysts makes use of zerovalent palladium metal and, typically, copper oxides upon alumina or silica support. It should be noted that, although some of this literature makes use of palladium (II) chloride and copper (II) chloride in catalyst preparation, it is usually explicitly evident and is always implicitly evident from a consideration of the thermal stabilities and properties of the inorganic compounds involved, that the actual catalyst involves palladium (O) and a mixture of copper oxides and basic copper choride. For example, Keggi (French 1,539,443) treats an inert support with a solution containing palladium (II), copper (II), and aluminum (III) chlorides, dries the support, then calcines at 600° C. for two hours. At this temperature, well above the decomposition temperature of palladium (II) chloride, $PdCl_2$ is reduced to Pd (O). This temperature is also well above the melting point of copper (II) chloride and the sublimation temperature of aluminum (III) chloride. Indeed, as Keggi reports, the total concentration of chloride remaining on and in the calcined catalyst is very low.

The present invention is directed to the provision of new and superior oxidation catalysts, which are particularly effective for the conversion of CO to $CO_2$ and $SO_2$ to $SO_3$.

SUMMARY OF THE INVENTION

In accordance with the present invention, there are provided oxidation catalysts comprising aqueous homogenous solutions containing specified proportions of a water-soluble palladium (II) salt, a copper (II) halide, a copper (II) salt of an oxyanion derived from a strong acid, and the balance substantially water. There are also provided heterogeneous oxidation catalysts comprising specified proportions of the water-soluble palladium (II) salt, the copper (II) halide and the other copper (II) salt, with or without an appropriate carrier.

There are also provided processes for oxidizing CO and $SO_2$ to $CO_2$ and $SO_3$, respectively, by contacting a gaseous charge containing CO and/or $SO_2$ with a catalyst of the character specified above.

SPECIFIC EMBODIMENTS OF THE INVENTION

As indicated above, the compositions of this invention contain a water-soluble palladium (II) salt. Typical of such salts are the: chloride, bromide, nitrate, sulfate and $Li_2PdCl_4$. Particularly preferred is palladium (II) chloride.

The concentration of the palladium (II) salt in the homogeneous solutions can range from at least about 0.00005 mole per liter to the solubility of the salt in water. Preferred concentrations range from about 0.001 to about 0.02M.

A mixture of copper (II) salts (b) and (c), is employed. One salt (b) is a halide, namely the chloride or bromide. The chloride is preferred. The other salt (c) is a non-halide, and is a salt of an oxyanion derived from a strong acid. Typical of (c) are: nitrate, sulfate, alkylsulfonate (e.g. methanesulfonate), trifluoromethanesulfonate, aryl sulfonate (e.g. p-toluenesulfonate, tetrafluoroborate, perchlorate, trifluoroacetate, trichloroacetate and methanephosphonate.

The total concentration of the copper (II) salts (b) and (c) ranges from about 0.003 to about 3, and preferably 0.1 to 2.0 moles per liter. Solutions with very low copper (II) concentrations, below 0.003M, are limited in the rate at which reduced palladium (O) can be reoxidized, and in unfavorable operating conditions may precipitate reduced palladium metal, removing it from the homogeneous system with consequent loss of catalytic activity. At copper (II) salt concentrations above about 3 moles per liter two disadvantageous factors emerge: increased solution viscosity which impairs the ease and efficiency of gas-liquid mixing, and the possibility of exceeding salt solubilities and precipitating catalyst or co-catalyst under actual operating conditions in which water evaporation may involve fluctuations in water content.

A critical relationship of the aqueous homogeneous catalysts is the balance of copper (II) halide (b) and the other copper (II) salt (c). It has been found that superior results are realized by employing from about 10 to about 80, and preferably 15-60, mole per cent of salt (b) of the total of (b) and (c), with (c) the remainder.

Stated in another manner, the approximate concentration relationships of the several components are as follows:

0.005-10, preferably 0.1-2, grams per liter of palladium (II), 0.2-200, preferably 6-120, grams per liter of total copper (II), and 10-80, preferably 15-60, mole per cent of copper (II) salt (b) of the total copper (II) salts.

The chloride ion concentration is 0.1-0.9 preferably 0.2-0.7, times the weight of copper (II); or, when bromide ion is present instead of chloride ion, the bromide ion concentration is 0.25-2, preferably 0.4-1.5, times the weight of copper (II) present.

As mentioned above, the palladium (II) salt can be in the form of $Li_2PdCl_4$. Thus, LiCl in association with $PdCl_2$ serves to facilitate dissolution of $PdCl_2$ in water. In this regard, it has been found that when $PdCl_2$ and LiCl are added to a solution containing copper (II) salts (b) and (c), the resulting solution is effective as an oxidation catalyst; however, when the resulting solution is allowed to age at ambient temperature (20–25° C.) for about three hours or more, it is substantially more effective as an oxidation catalyst.

In addition to the palladium (II) salt (a) and the copper (II) salts (b) and (c), the homogeneous solutions can also contain a compatible chloride or bromide salt to aid in the dissolving of the palladium (II) salt. Chloride and bromide salts of Group IA and Group IIA metals, for example, have no adverse effect upon the catalytic activity of the solutions. The solutions can also contain any other dissolved salts which are compatible with the palladium (II) and copper (II) salts, that is, which do not form specific complexes or precipitates of copper (II) or palladium (II). It should be noted that when a salt such as lithium salt is included, the halide/non-halide ratio, (b)/(c), applies to the total anion concentrations.

The solutions are prepared by adding the salts (a), (b) and (c), with or without a chloride or bromide salt of a Group IA and/or Group IIA metal, to water in the concentrations specified above. Other than the aging effect already mentioned with respect to a solution containing LiCl, the particular order of addition of salts (a), (b) and (c) to water has no substantial influence upon the catalytic effectiveness of the resulting solution.

When the homogeneous catalysts are employed for the oxidation of CO to $CO_2$ and $SO_2$ to $SO_3$, the temperature used can be from about 0° C. to about 100° C., and preferably at 10–50° C., at atmospheric pressure. Variation in pressure can range from subatmospheric (the limit being the vapor pressure exerted by the catalyst solution) through to superatmospheric, with the preferred pressure being at or near atmospheric pressure.

Flow rates depend upon the geometry of the apparatus employed. Contact time will range from about 0.1 second to about 5 seconds, with a preferred range of 0.3-3 seconds.

The CO partial pressure can be any fraction of the total gas pressure. CO removal at partial pressures as low as $4 \times 10^{-5}$ atmospheres, which is the limit of the detection system employed, has been accomplished. For $SO_2$, any partial pressure which does not liquify it is acceptable. With the preferred total pressure close to atmospheric, the preferred partial pressures of these reactant gases are 0-0.5 atmospheres.

If there should be less than a stoichiometric excess of oxygen in the feed gas (with respect to CO and/or $SO_2$), then the catalyst solution should be contacted periodically with an oxygen-containing gas, such as air, in order to reoxidize copper (I) and retain catalyst activity. This can be done by continuous recycling or batch treatment.

The heterogenous catalysts of this invention comprise a support material impregnated with specified amount of the palladium (II) salt (a) and of the copper (II) salts (b) and (c). Here again, the water-soluble palladium (II) salts (a) and copper (II) salts (b) and (c), above, are employed. Typical supports include alumina, silica, silica alumina, zirconia, thoria, aluminum silicates, zeolites, magnesia, silicon carbide and the like. Such supports are well known in the art and are available commercially. Particularly useful are those supports which can be used at temperatures generally existing in vehicle exhaust systems and industrial stacks.

The supported catalysts are repared by contacting an aqueous homogeneous solution with a suitable support, and slurrying the solution with the support at 0° C.–300° C., preferably 60–150° C., for 5-60 minutes. The support which has become impregnated with the solution is separated from the remaining solution, as by suction filtration, and is dried. Drying can be accomplished with an aspirator air stream for several minutes, then by keeping the impregnated support under vacuum (e.g. 20 mms.) at 20-25° C. for 16 hours, followed by about 24 hours at 20 mms. vacuum at 60° C. There is no need to calcine the catalyst.

The resulting supported catalysts will contain: at least about 0.00001, preferably 0.0003 to 0.03 gram-moles of palladium (II) salt per kilogram of inert support, and the total copper (II) salts from about 0.001 to about 1.5, preferably 0.03–0.8, gram-moles per kg., with the same approximate ratio of (b)/(c) as specified above.

The concentration relations can also be expressed:

0.001–10, preferably 0.3–3, grams of palladium (II) per kilogram of inert support,
0.06–100, preferably 2–50, grams of copper (II) per kilogram of inert support,
10–80, preferably 15–60, mole percent of copper (II) salt (b) of the total coper (II) salts.

The chloride and bromide concentrations are the same as those given above for homogeneous catalysts.

Here also, a salt of a Group IA or Group IIA metal which does not cause precipitation of a copper or palladium salt, can be employed.

The heterogeneous catalysts can be employed in oxidation reactions, and particularly for converting CO to $CO_2$ and $SO_2$ to $SO_3$, at temperatures of the approximate range of from about 0° to about 300° C., and preferably from ambient temperature to about 150° C.

Total pressure can be atmospheric, sub- and super-atmospheric, with those approximating atmospheric being preferred.

With regard to gas flow rates, a minimum of about 0.1 second contact time is employed. An upper limit is governed by considerations of practical economics (and upon how rich the gas stream is in oxidizable contaminant gases). Preferred contact times range from 0.3 to 3.0 seconds.

With employment of the heterogeneous catalysts, it is recommended that molecular oxygen also be included in the reaction system. In order to have catalyst life-times of practical duration, molecular oxygen is present in at least stoichiometric quantities in the gas stream being treated.

ILLUSTRATIVE EXAMPLES

The homogeneous solutions and oxidation reactions therewith, are illustrated by the following examples.

Example 1

To a 500-m. gas-scrubbing bottle fitted with a standard coarse glass diffusing frit was added 100 ml. of an aqueous solution. A mixture of helium 98% and carbon monoxide 2.00% was then passed through the diffusing frit at atmospheric pressure and at 23° C. The gas flow rate was 640±40 ml./min. and the mean gas-liquid contact time (based upon solution and overhead foam volumes) was 1.9±0.1 sec. Samples of exit gas were collected at 9.0 minutes and again at 10.0 minutes after the gas flow was started; these were analyzed by quantitative gas chromatography for carbon monoxide and for carbon dioxide. The results, expressed for various aqueous solutions as percent conversion of CO to $CO_2$, are shown in Table I below and in the drawing.

The aqueous solutions were prepared by dissolving $PdCl_2$, LiCl, $CuCl_2$ and $Cu(NO_3)_2$ in water at about 20–25° C.

TABLE I

| Total Cu salt | $PdCl_2$ | LiCl | $CuCl_2$, percent of total Cu salt | $Cu(NO_3)_2$, percent of total Cu salt | Percent conversion of CO to $CO_2$ |
|---|---|---|---|---|---|
| 1.00 M | .0010 M | .0020 M | 100 | Nil | a Nil |
| 1.00 M | .0010 M | .0020 M | 80 | 20 | a Nil |
| 1.00 M | .0010 M | .0020 M | 60 | 40 | 0.4 |
| 1.00 M | .0010 M | .0020 M | 40 | 60 | 4.2 |
| 1.00 M | .0010 M | .0020 M | 20 | 80 | 58 |
| 1.00 M | .0010 M | .0020 M | Nil | 100 | a Nil |
| 0.97 M | .0040 M | .0080 M | 100 | Nil | 26 |
| 0.97 M | .0040 M | .0080 M | 80 | 20 | 41 |
| 0.97 M | .0040 M | .0080 M | 60 | 40 | 72 |
| 0.97 M | .0040 M | .0080 M | 40 | 60 | b 85 |
| 0.97 M | .0040 M | .0080 M | 20 | 80 | c 78 |
| 0.97 M | .0040 M | .0080 M | Nil | 100 | 0.8 | a No detectable $CO_2$; threshold of detection is 0.2% conversion level.
b A white precipitate of cuprous hydroxide was formed after 10 minutes' operation.
c A white precipitate of cuprous hydroxide and a dark precipitate of Pd and/or PdO was formed after 10 minutes' operation.

Example 2

The apparatus and procedure of Example 1 was employed. Gas flow rate was regulated at 630±10 ml. of CO per minute. All runs were conducted at 23° C. LiCl concentration in each run was approximately twice the concentration of the palladium or rhodium chloride concentration.

$PdCl_2$ was compared with $RhCl_3$. Various combinations of cupric salts were used. Comparison is also given of ferric salts and of organic redox compounds, in place of the cupric salts.

Results are provided in Table II.

TABLE II

| Pd or Rh | Cupric salts, etc. | Gas-liquid contact time, sec. | Percent conversion of CO to $CO_2$ |
|---|---|---|---|
| Nil | $CuCl_2$, 0.50 M, $Cu(NO_3)_2$, 0.50 M | 1.5 | a Nil |
| $PdCl_2$, .005 M | $CuCl_2$, 0.50 M, $CuSO_4$, 0.50 M | 1.6 | 31 |
| $PdCl_2$, .005 M | $CuBr_2$, 0.50 M, $Cu(NO_3)_2$, 0.50 M | 1.9 | 32 |
| $RhCl_3$, .005 M | $CuCl_2$, 0.50 M, $Cu(NO_3)_2$, 0.50 M | 1.3 | a Nil |
| $PdCl_2$, .005 M | $FeCl_3$, 0.50 M, $Fe(NO_3)_3$, 0.50 M | 2.5 | ≈0.4 |
| $PdCl_2$, .005 M | p-Benzoquinone, 2.0 M in 1,2-propanediol | | ≈0.4 |
| $PdCl_2$, .0025 M | p-Benzoquinone, 1.0 M in a 1:1 mixture (vol./vol.) of ethanol and 1,2-propanediol. | 2. | 15 |
| $PdCl_2$, .005 M | $CuCl_2$, 0.50 M, $Cu(NO_3)_2$, 0.50 M (fresh mixed with Pd salt) | 1.3 | 17 |
| $PdCl_2$, .005 M | $CuCl_2$, 0.50 M, $Cu(NO_3)_2$, 0.50 M (after three hours' standing) | 1.3 | 82 | a No detectable $CO_2$; threshold of detection is ≈0.2%.

Example 3

A series of runs was carried out in which 1.5 liters of an aqueous solution was mixed vigorously with sulfur dioxide gas at 1.0 atm. pressure, for 20 minutes at 24° C. Mixing was accomplished by churning with a gas-liquid mixing device in a 3.0-liter glass flask, adding make-up sulfur dioxide to the gas phase continuously so as to maintain pressure. The solution was then degassed by agitation under reduced pressure for five minutes, purged with air, refluxed for 30 minutes, cooled, and aliquots withdrawn and titrated with standard base to determine acid normality.

Under this regimen the dissolved $SO_2$ is very substantially removed, so that in the case of no oxidation (see Run #1), the acid concentration in the degassed solution is very low. To the extent that oxidation of $SO_2$ has occurred, however, sulfuric acid will have been formed, and this acid cannot be removed from aqueous solutions by any degassing technique. The extent of formation of sulfuric acid, as measured by the development of the permanent acidity, measures the extent of oxidation of sulfur dioxide.

Run #1. This run was carried out with 1.5 liters of water. The water was completely saturated with sulfur dioxide within 15 minutes. After degassing, titration of aliquots with a standard base showed the residual acidity (due to sulfurous acid) to be 0.015 N (±0.001).

Run #2. This run was carried out as Run #1, except that the water was replaced with 1.5 liters of an aqueous solution containing 0.50M cupric chloride and 0.50M cupric sulfate. After treatment as in Run #1, the gross titratable acidity was found to be 2.006 N (±0.006). After correcting for the effective acidity of the cupric salts, the net gain in acidity upon 20 minutes' contact with $SO_2$ was 0.39 N.

Run #3. This was carried out in the same manner as Runs #1 and #2, except that the 1.5 liters of aqueous solution contained $3.55 \times 10^{-3}$ M palladous chloride, 0.50M cupric chloride, and 0.50M cupric sulfate. The gross titratable acidity was found to be 2.641 N (±0.013), which after correcting for the effective acidity of the salts showed a net gain of 0.96 N. This amount of formed acid is approximately 2½ fold greater than that in Run #2 and approximately sixty-fold greater than that in Run #1.

Example 4

A stream of helium containing $2 \times 10^4$ p.p.m. CO was passed through an aqueous solution containing 0.020 M $PdCl_2$, 1.00 M $CuCl_2$, and 1.00 M $Cu(NO_3)_2$. In each of three standard gas-washing bottles (250 ml. capacity, fitted with coarse fritted glass diffusers) was placed 150 ml. of catalyst solution, and the three bottles were connected in series downstream of a flowmeter connected to a cylinder containing the helium-carbon monoxide mixture. The cylinder valve was set to permit a flow of 235 ml./min. through the system. After 25 min. of operation at 22° C., a portion of untreated feed gas was then collected for comparison.

The gas samples were analyzed by gas chromotograph, with a standard thermal conductivity instrument (Aerograph Model 202-1C) fitted with a 6 ft. x ¼ in. column of Porapak Q for carbon dioxide assay and a 6 ft. x ¼ column of molecular sieve 5A for carbon monoxide assay, both determinations run at a column temperature of 30° C. Assays were made in quadruplicate, with retention of the best three of each set of four determinations.

Data is given below in Table III, showing that the CO content of the gas mixture is reduced from 2.0 to 0.06%, at the same time that a major $CO_2$ peak appears, as a result of passage through the catalyst system. Cross analysis of the untreated gas shows the presence of a small amount of $CO_2$, about 0.05%, as an initial impurity.

This study, with an effective gas-liquid contact time of about 1.5 sec., shows that a gas stream containing $2 \times 10^4$ p.p.m. carbon monoxide can be treated to effect conversion of 97% of the CO to $CO_2$.

TABLE III

Gas chromatographic analyses of gas mixture

| | CO, percent | | $CO_2$, percent | |
|---|---|---|---|---|
| Feed gas | 1.96<br>2.02<br>2.02 | (Avg. 2.00%) | 0.06₂<br>0.03₁<br>0.04₆ | (Avg. 0.05%) |
| Effluent gas | 0.05₈<br>0.07₁<br>0.05₀ | (Avg. 0.06%) | 2.03<br>2.00<br>1.97 | (Avg. 2.00%) |

NOTE.—SD of analyses: Overall±0.021% as CO (8 DF), low range± 0.010% as CO (4 DF).

Heterogeneous catalysts and oxidation reactions therewith, are illustrated by the following examples.

Example 5

Four solid catalyst systems were prepared by contacting portions of an aqueous catalyst solution with each of the following: (a) Molecular Sieve 5A, a crystalline alumino-silicate marketed by Union Carbide; (b) silica gel; (c) activated alumina, and (d) activated charcoal Norit "A" marketed by Matheson Coleman & Bell. The catalyst solution comprised: $PdCl_2$, 0.01 M; LiCl, 0.02 M; $CuCl_2$, 0.788 M; $Cu(NO_3)_2$, 0.98 M, and the balance water.

To 50-ml. portions of the above catalyst preparation solution were added 10.0-g. portions of each of several solid catalyst supports, described in Table IV below. The mixtures were slurried for 15 minutes at room temperature, then the solids were collected by suction filtration and dried for five minutes by an aspirator air stream. Then, the resulting moist cakes were broken up and the solids dried overnight at 20 mm. pressure. The solids were then further dried at 60° C. and 20 mm. pressure for an additional 24 hours. Each supported catalyst powder was then weighed to determine the amount of catalyst picked up, then packed into a copper column 36 inches long and 0.190 inch internal diameter, closed with loose glass-wool plugs to prevent catalyst loss.

The pickup of weight for each of four catalyst supports, and the indicated concentrations of components per kilogram of catalyst support, is:

| Support | Wt. gain after drying, per 10 g. of support | Calculated concentrations, gram-moles/kg. support | | | |
|---|---|---|---|---|---|
| | | $PdCl_2$ | $CuCl_2$ | $Cu(NO_3)_2$ | LiCl |
| Alumina | 1.0 | .0034 | .270 | .335 | .0068 |
| Norit A | 1.0 | .0034 | .270 | .335 | .0068 |
| Molecular sieve | 2.8 | .0096 | .755 | .938 | .0190 |
| Silica | 2.8 | .0096 | .755 | .938 | .0190 |

The average weight increase of each support is 19%. It appears that the concentration of palladium (II) in each of the four catalysts is about 0.003-0.01 moles/kg. support.

In the experiments, a stream of helium containing 2.00% carbon monoxide (CO) and a stream of compressed air were combined in an atmospheric pressure manifold, and the resulting mixed stream was passed through a standard 500 ml. gas sparger containing 150 ml. of water, thus humidifying the gas mixture. The gas mixture was then passed through a section of copper tubing (36 inches by 0.250 inch outside diameter, 0.190 inch inside diameter, and with approximately 24 inches of the length packed with the solid catalyst-and-support combination being tested), and then to an exit vent from which samples were periodically withdrawn. For a control run with no supported catalyst, the exit sample was withdrawn immediately downstream of the humidifying gas sparger. Crude flow controls of the air and the helium-CO streams were accomplished by floating ball flow-meters; however, the actual amount of air in the gas mixture was determined more accurately in the course of gas chromatographic analysis of the exit gas samples.

Gas chromatographic analysis was obtained on samples collected in standard 125 ml. gas collection flasks which were evacuated immediately prior to sampling. Analysis was carried out with 2.00 ml. gas samples using a parallel-column assembly (Porapak Q packing in one leg, 10 ft. x ¼ inch, and Molecular Sieve in the other leg, 4 ft. x ¼ inch) at 130° C. injector 165° C., detector (thermal conductivity, at 150 milliamperes) 240° C., and a helium flow rate of 50 ml./min.

The results of these runs are shown in Table IV. Except for the control run, which showed no detectable conversion, eight runs with four solid supports show CO conversions of from 2% to 100%.

TABLE IV

| Catalyst support [a] | Time on stream, min. | Percent air in feet gas [a] | Gas-catalyst contact time [b] | Percent conversion of CO to $CO_2$ [c] |
|---|---|---|---|---|
| Molecular sieve 5A, 80/100 mesh | 20 | 15 | 1.7 | 60 (61, 59) |
| Do | 47 | 3 | 2.0 | 53 (52, 53) |
| Silica gel, Grade 12, 28/200 mesh | 15 | 8 | 1.7 | 2 (2, 2, 2) |
| Do | 37 | 7 | 1.8 | 44 (43, 44) |
| Do | 51 | 4 | 2.0 | 51 (50, 51) |
| Alumina, chromatographic grade, 80/325 mesh | 20 | 29 | 100 | 95 (94, 95) |
| Do | 40 | 23 | 115 | [d] 100 (100, 100) |
| Charcoal, Norit "A," fine powder | 47 | 64 | 160 | [d] 100 (100, 100) |
| Control (no catalyst) | | 13 | | [e] Nil |

[a] Determined by quantitative gas chromatography of the exit gas.
[b] Based upon the estimate that 70% of tubing internal volume is filled by catalyst and solid support: contact time=0.30×(nominal tube volume)/(flowmeter flow rate).
[c] Determined by quantitative gas chromatography; figures in parentheses are replicate individual determinations.
[d] No detectable residual CO; threshold of detection is about 0.2% of the feed concentration.
[e] No detectable $CO_2$; threshold of detection is about 0.3% of the feed concentration of CO for these experiments.

What is claimed is:

1. An aqueous homogeneous solution consisting essentially of
   (a) a water-soluble palladium (II) salt, said salt being selected from the group consisting of a chloride, bromide, nitrate, sulfate, and $Li_2PdCl_4$, having a concentration of metal ion of at least about 0.00005 to about 0.025 mole per liter,
   (b) a copper (II) chloride or bromide,
   (c) a copper (II) salt selected from the group consisting of a nitrate, sulfate, alkylsulfonate, arylsulfonate, tetrafluoroborate, perchlorate, trifluoroacetate, trichloroacetate and methanephosphonate, and
   (d) the balance water,
wherein the total concentration of (b) and (c) is from about 0.003 to about 3 moles per liter, and wherein the copper (II) chloride or bromide (b) comprises from about 10 to about 80 mole percent of the total of (b) and (c).

2. A solution of Claim 1 wherein the palladium salt (a) is palladium (II) chloride.

3. A solution of Claim 1 wherein the concentration of (a) is from about 0.001 to about 0.02 mole per liter.

4. A solution of Claim 1 wherein the copper (II) halide (b) is copper (II) chloride.

5. A solution of Claim 1 wherein the copper (II) salt (c) is copper (II) nitrate.

6. A solution of Claim 1 wherein the copper (II) halide (b) comprises from about 15 to about 60 mole percent of the total of (b) and (c).

7. A solution of Claim 1 wherein the palladium (II) salt is $Li_2PdCl_4$.

8. A solution of Claim 7 wherein said solution is aged.

9. A composition consisting essentially of
   (a) from about 0.0003 to about 0.03 gram-moles of a water-soluble palladium (II) salt selected from the group consisting of a chloride, bromide, nitrate, sulfate and $Li_2PdCl_4$,
   (b) from about 0.001 to about 1.5 gram-moles of copper (II) salts,
wherein a cupric (II) chloride or bromide comprises from about 10 to about 80 mole percent of the total of (b) and the balance is a copper (II) salt selected from the group consisting of a nitrate, sulfate, alkylsulfonate, arylsulfonate, tetrafluoroborate, perchlorate, trifluoroacetate, trichloroacetate and methanephosphonate.

10. A composition of Claim 9 deposited upon a carrier.

References Cited
UNITED STATES PATENTS

| | | | |
|---|---|---|---|
| 3,102,919 | 9/1963 | Hirschbeck et al. | 252—441 X |
| 3,154,586 | 10/1964 | Bander et al. | 252—438 X |
| 3,410,807 | 11/1968 | Lloyd | 252—429 R |
| 3,790,662 | 2/1974 | Lloyd et al. | 252—441 X |

PATRICK P. GARVIN, Primary Examiner

U.S. Cl. X.R.

252—429 R, 433, 440, 441; 423—213.5